United States Patent
Ostermeier et al.

(10) Patent No.: US 6,176,655 B1
(45) Date of Patent: Jan. 23, 2001

(54) DRILL AND A CHUCK FOR RECEIVING THE DRILL SHANK

(75) Inventors: Peter Ostermeier, Diessen; Franz Hoyss, Wackerberg, both of (DE); Peter Roth, Grabs (CH)

(73) Assignee: Hilti Aktiengesellschaft, Schaan (LI)

( * ) Notice: Under 35 U.S.C. 154(b), the term of this patent shall be extended for 0 days.

(21) Appl. No.: 09/252,192

(22) Filed: Feb. 18, 1999

(30) Foreign Application Priority Data

Mar. 13, 1998 (DE) .............................................. 198 10 911

(51) Int. Cl.$^7$ .................................................. B23B 31/113
(52) U.S. Cl. ........................ 408/239 R; 279/91; 279/93; 408/226
(58) Field of Search .......................... 408/226, 239 R, 408/238; 409/232, 234; 279/89, 93, 103, 90, 91

(56) References Cited

U.S. PATENT DOCUMENTS

| | | | |
|---|---|---|---|
| 3,756,737 | * | 9/1973 | Smith ................................... 408/239 |
| 4,184,692 | * | 1/1980 | Benson et al. ......................... 279/75 |
| 4,234,277 | * | 11/1980 | Benson et al. ....................... 408/226 |
| 4,834,596 | * | 5/1989 | Hollifield et al. .................... 409/232 |
| 5,257,884 | * | 11/1993 | Stolz et al. ........................... 409/232 |
| 5,429,457 | * | 7/1995 | Asano et al. ......................... 408/204 |
| 5,879,544 | * | 3/1999 | Cassidy ................................ 210/90 |
| 6,000,888 | * | 12/1999 | Hartman ........................... 408/239 R |

FOREIGN PATENT DOCUMENTS

| | | | |
|---|---|---|---|
| 0169740 | * | 9/1984 | (JP) ..................................... 408/238 |
| 0157746 | * | 7/1987 | (JP) ..................................... 408/238 |
| 0157747 | * | 7/1987 | (JP) ..................................... 408/238 |
| 138465 | * | 1/1960 | (SU) .................................... 408/238 |

\* cited by examiner

Primary Examiner—Steven C. Bishop
(74) Attorney, Agent, or Firm—Brown & Wood, LLP

(57) ABSTRACT

A drill bit having a drill body and a drill shank including a substantially cylindrical guide portion (10) having at least one guide surface (101, 102), and a locking portion (11) projecting radially beyond the guide portion and having locking surfaces (111, 112) extending substantially perpendicular to a longitudinal axis of the drill bit, with the locking portion (11) having, perpendicular to the drill bit longitudinal axis, a non-circular cross-section; and a drill chuck for receiving the shank.

3 Claims, 3 Drawing Sheets

DRILL AND A CHUCK FOR RECEIVING THE DRILL SHANK

BACKGROUND OF THE INVENTION

1. Field of the Invention

The present invention relates to a drill bit having a drill body and a shank connected with the drill body and including a substantially cylindrical guide portion having a least one guide surface, and a locking portion projecting radially beyond the guide portion. The present invention also relates to a chuck for receiving the drill shank.

2. Description of the Prior Art

For forming bores in hard constructional components formed of concrete, stone, steel and the like, a drill bit, such as described, e.g., in German Patent Publication No. 3,744,091 and having a tubular carrier member which is provided in its front, in the drilling direction, end region with an annular cutting element and is provided at its opposite, rear end with a shank, is used. Here and elsewhere, under 20 "drilling direction" is understood the direction in which the drill bit advances when forming a bore. The shank has a guide portion and a locking portion which projects radially beyond the guide portion. The locking portion is provided with a thread which serves for axially fixing the drill bit in a drill chuck. The chuck has an axially displaceable locking sleeve with a mating thread corresponding to the shank thread. After the insertion of the drill shank into the chuck, the shank and, thus, the drill bit is locked in the chuck by completely rotating the locking sleeve several times into its locking position. Because of the thread, the manufacturing of the chunk is expensive.

Accordingly, an object of the present invention is to provide a drill bit with a shank which can be economically produced and which can be rapidly and simply inserted into a chuck.

Another object of the present invention is to provide a chuck for receiving the inventive drill shank.

SUMMARY OF THE INVENTION

These and other objects of the present invention, which will become apparent hereinafter are achieved by providing a drill bit with a shank the locking portion of which has its locking surfaces extending substantially transverse to a longitudinal axis of the drill, and the cross-section of which extending transverse to the longitudinal axis of the drill, is non-circular. The simplified shape of the locking region substantially reduces costs of manufacturing the drill bit.

For manufacturing reasons, the outer contour of the locking portion of the shank is provided, e.g., with at least one indentation. In order to eliminate a complicated alignment of the drill bit relative to the chuck, when the drill, i.e., the drill shank is inserted into the chuck, the outer contour of the locking portion of the shank is provided, e.g., with two indentations uniformly arranged over the circumference of the locking portion of the shank.

Advantageously, the guide region adjoins the locking region in a direction opposite to the drilling direction. This insures that the drill bit, i.e., the drill shank is insertable in the chuck of a drilling tool in a direction opposite to the drilling direction and is withdrawn in the drilling direction. For insuring a precise guidance of the drill shank in the chuck, the guide portion is advantageously provided with two spaced from each other guide surfaces.

In order to prevent an automatic rotation of the drill bit in the chuck, which is in its locking position, advantageously, at least one locking element is provided on at least one of the locking surfaces of the locking portion of the shank. The locking element can be formed, e.g., as an indentation or as a projection provided on the locking surface, or as cam secured on the locking surface.

Preferably, the drill chuck includes a support member having an opening and a first mating surface facing in the drilling direction, and a clamping sleeve arranged transverse to a longitudinal axis of the chuck and axially displaceable relative to the support member. The clamping sleeve has an end region facing in the drilling direction and having an inner diameter a cross-section of which corresponds to the cross-section of the locking portion of the drill shank. The opening formed in the support member has a cross-section which is defined by the first mating surface and which extends beyond the cross-section of the facing in the drilling direction, end region of the clamping sleeve defined by a second mating surface which is located adjacent to the first mating surface. With this chuck, a quick insertion of the drill bit and a precise guidance of the shank in the chuck is achieved.

In addition to good locking characteristics, particularly good guide characteristics are achieved when the opening, which is formed in the support member, has preferably two axial regions located one behind the other, with the region, which is remote from the mouth of the opening and which is defined by the first mating surface, extending, in a transverse direction, beyond the other region.

A seal is provided in the end region of the support member facing in the direction opposite to the drilling direction. In the locking position of the drill chuck, the seal cooperates with a free end of the shank facing in the direction opposite to the drilling direction. To prevent friction between the drill bit, i.e., the shank and the seal during rotation of the shank in the chuck, advantageously, a portion of the support member is formed as a ring which at least partially forms a portion of the support member extending from the mouth of the opening of the support member, and which can be displaced relative to the remaining part of the support member in the direction opposite to the drilling direction against a biasing force of a spring element. In the non-locking position of the chuck, a portion of the ring, which cooperates with the locking portion of the shank, projects beyond the mating surface provided on the support member, so that the free end of the guide portion of the drill shank does not contact the seal during the rotation of the shank in the chuck.

In order to provide for a sidewise support of the shank in the chuck transverse to the radial extent of the shank locking region, advantageously, the ring is at least partially rotated in a circumferential direction relative to the remaining portion of the support member.

In order to achieve an automatic rotation of the drill bit in the non-locked chuck from a release position or a locking position, advantageously, at least one spring member is provided on the ring which projects beyond the outer contour of the ring and is formlockingly engageable with the clamping sleeve.

Rotation of the drill bit relative to the chuck, when the chuck is in its locking position is advantageously prevented by providing at least one locking element on at least one of the mating surfaces. This locking element can be formed as an indentation or as a projection formed on one of the locking surfaces, or as an cam secured on one of the mating surfaces. This locking element provides for a formlocking connection with a locking element provided on the locking portion of the drill shank.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein.

DETAILED DESCRIPTION OF THE PREFERRED EMBODIMENT

Figure 1:
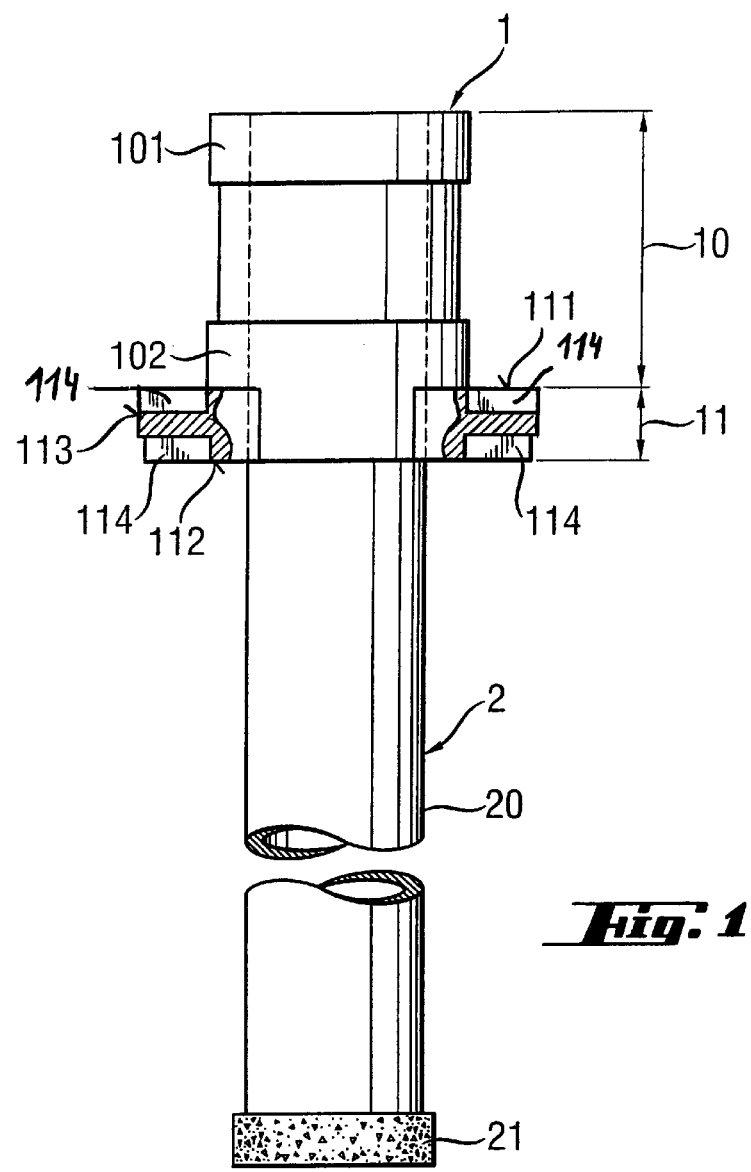
FIG. 1 shows a side elevational view of a drill according to the present invention with a shank.
Figure 2:
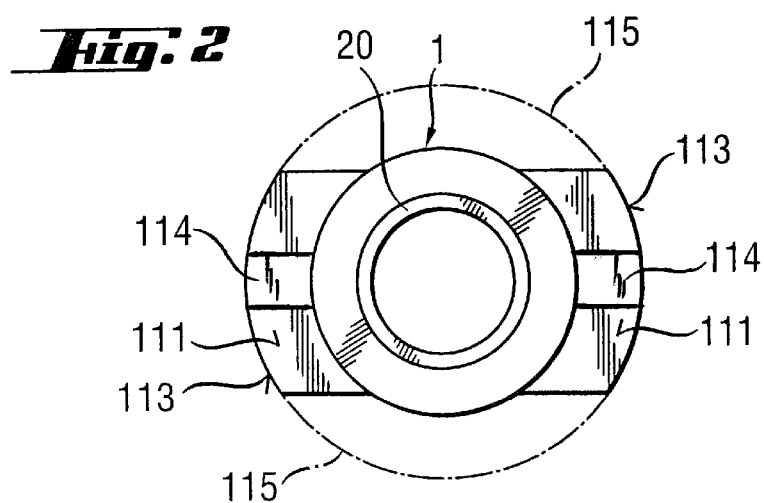
FIG. 2 shows a plan view of the drill shown in FIG. 1.

A drill bit according to the present invention, which is shown in FIGS. 1 and 2, includes a drill body 2 formed as tubular carrier member 20 provided with a cutter ring 21 at its front, in a drilling direction, and a shank 1 provided at the opposite end of the carrier member 20. The shank 1 has a cylindrical guide portion 10 and a locking portion 11 which projects radially beyond the guide portion 10. The guide portion 10 has two guide surfaces 101 and 102 extending over the circumference of the guide portion 10 and spaced from each other. The guide portion 10 can have, e.g., two regions having different diameters. Each of the regions includes a respective guide surface, with the larger diameter region adjoining the locking portion.

The locking portion 11 has two opposite locking surfaces 111, 112 which extend perpendicular to the longitudinal axis of the drill bit and face in opposite directions. The locking surface 112, which faces in the drilling direction, has two locking elements 114 arranged substantially opposite to each other and formed as recesses. The two recesses open, e.g., toward an outer surface 113 of the locking portion 11 the locking surface 11 also can be provided with two locking elements 114, as shown in FIG. 1.

As shown in FIG. 2, the cross-section of the locking portion 11 deviates from a circular profile, being reduced by two substantially circular sections 115.

Figure 3:
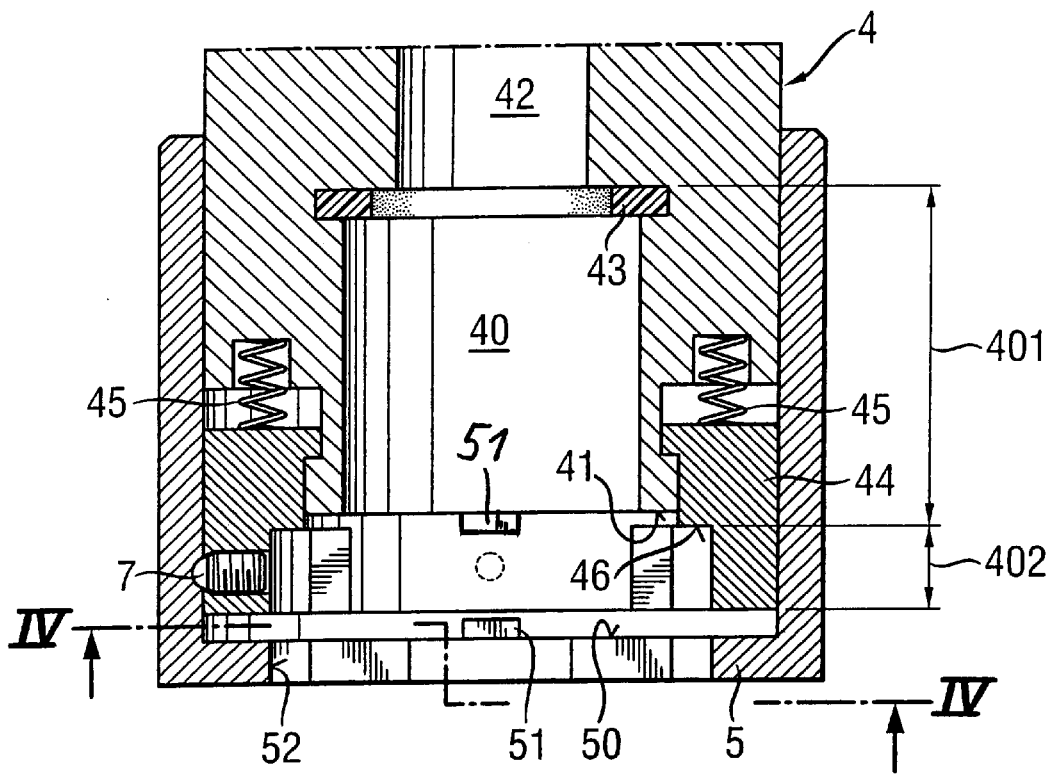
FIG. 3 shows a simplified partial cross-sectional view of a chuck according to the present invention with a back-up ring.
Figure 4:
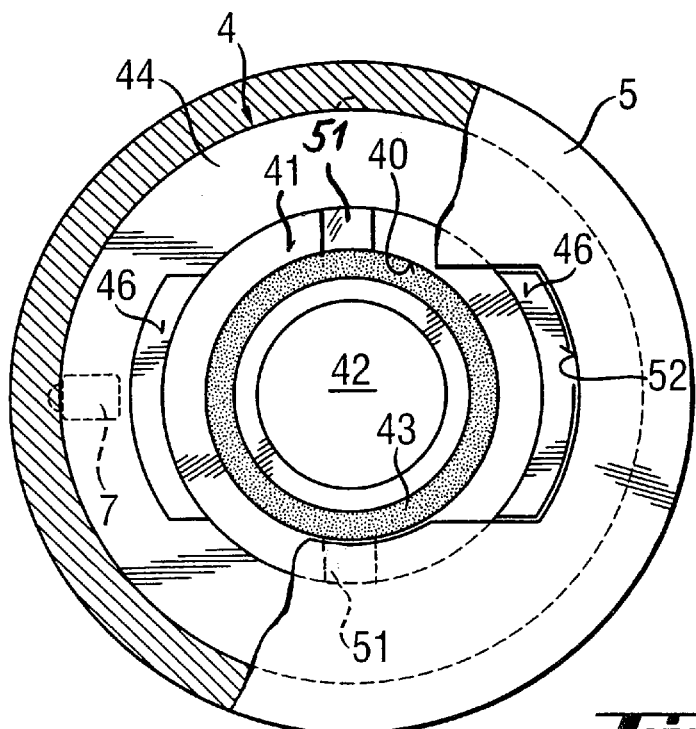
FIG. 4 shows a cross-sectional view of the chuck along line 4—4 in FIG. 3 in a drill withdrawal position, without the drill.
Figure 5:
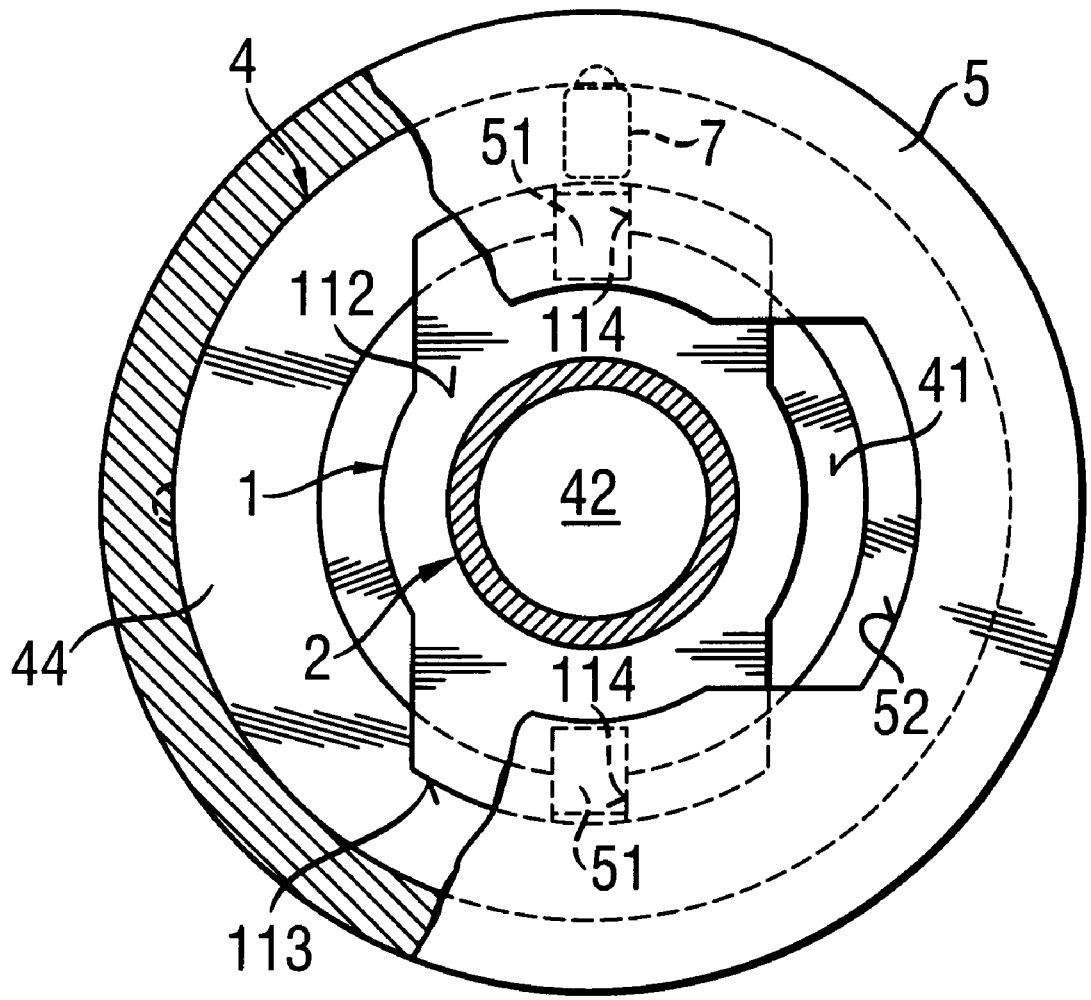
FIG. 5 shows a cross-sectional view of the chuck in a drill locking position with the drill.

A chuck, which is shown in FIGS. 3–5, serves for receiving the drill bit shown in FIGS. 1–2. FIG. 3 shows a support member 4 with an opening 40 corresponding to the guide portion 10 of the shank 1. The chuck further includes a clamping sleeve 5 which surrounds the support member 4 and which can be displaced in the drilling direction relative to the support member 4 against a biasing force of a spring (not shown), e.g., with a tool (not shown). The opening 40 has two axial regions 401, 402 located one behind the other and having different cross-sections, with the region 402 at the side of the opening 40 facing in the drilling direction having a larger cross-section than the region 401 remote from the side of the opening 40 facing in the drilling direction. A rear through-bore 42 adjoins the remote region 401.

A washer-shaped seal 43 is provided in a transition region between the opening 40 of the support member 4 and the rear through-bore 42. A portion of the support member 4 is formed as a ring 44. The ring 44 defines the axial region 402 of the opening 40.

The ring 44 is displaceable in a direction opposite to the drilling direction against a biasing force of a spring member 45 and is at least partially rotatable in an circumferential direction. The cross-section of the opening 40 in the region 402 at least corresponds the cross-section of the end region of the clamping sleeve 5 facing in the drilling direction. In the release position of the chuck, a stop shoulder 46 of the ring 44 projects beyond mating surface 41 of the support member 4 in the drilling direction. Upon rotation of the drill bit, which is inserted in the chuck, the stop shoulder 46 cooperates with the locking surface 111 of the drill shank and prevents contact of the free end of the guide portion 10 with the seal 43. The rotation of the ring 44 relative to the remaining portion of the support member 4 is limited by a stop surface and a stop (not shown). The ring 44 can rotate, e.g., relative to the support member 4 by 90°.

At least one spring member 7, which is formed as a threaded pin with a spring-biased ball, is arranged on the ring 44, projecting beyond the outer contour of the ring 44. The spring member 7 formlockingly cooperates, in both the release and locking positions, with an indentation formed in the inner surface of the clamping sleeve 5. The length of the region 402 of the opening 40 in the drilling direction corresponds at most to the length of the locking portion 11 measured in the direction parallel to the longitudinal axis of the drill.

The clamping sleeve 5 has in its end, in the drilling direction, region, a bottom with a central opening 52. The cross-section of the opening 52 corresponds to the cross-section of the locking region 11 of the drill shank 1. The region of the opening 52 of the clamping sleeve 5, which faces in a direction opposite to the drilling direction, forms a second mating surface 50. A locking member 51, which is formed as a cam, projects from the mating surface 50 in the direction opposite to the drilling direction.

In the release position shown in FIG. 4, the distance between a first mating surface 41 of the support member 4 and the locking member 51 projecting from the second mating surface 50 of the clamping sleeve 5 is larger than the length of the locking portion 11 of the shank 1 of the drill bit.

In FIG. 5, the ring 44 is pivoted by 90° with respect to the position of the ring 44 shown in FIG. 4. In the position shown in FIG. 5, the locking member 51 of the clamping sleeve 5 formlockingly engages the locking element 114 of the locking portion 11 of the drill shank 1.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A drill chuck for receiving a drill shank of a drill bit and having a substantially cylindrical guide portion having at least one guide surface, and a locking portion projecting radially beyond the guide portion and having locking surfaces extending substantially perpendicular to a longitudinal axis of the drill bit with the locking portion having, perpendicular to the drill bit longitudinal axis, a non-circular cross-section, the drill chuck comprising:

a support member having an opening and a first mating surface facing in a drilling direction that corresponds to a direction in which the drill bit advances when forming a bore; and a clamping sleeve arranged transverse to a rotational axis of the chuck and axially displaceable relative to the support member, the clamping sleeve having an end region facing in the drilling direction and having an inner diameter with a cross-section corresponding to the cross-section of the locking portion of the drill shank, the opening having a cross-section defined by the first mating surface and extending radially beyond a cross-section of the end region facing in the drilling direction, the end region of the clamping sleeve defined by a second mating surface located adjacent to the first mating surface, wherein the opening has two axial regions arranged one after another, wherein a region remote from a mouth of the opening extends, in a direction transverse to the rotational axis of the chuck, beyond cross-sectional dimension of another of the two regions, defining the first mating surface, wherein a portion of the support member is a ring at least partially defining the remote region of the opening and being displaceable relative to a remaining portion of the support member in a direction opposite to the drilling direction against a spring-biasing force.

2. A drill chuck according to claim 1, wherein the ring at least partially rotates against the remaining portion of the support member in a circumferential direction.

3. A drill chuck according to claim 1, further comprising at least one spring member provided on the ring and projecting beyond an outer surface of the ring, the spring member being lockingly engageable with the clamping sleeve.

* * * * *